United States Patent
Szilagyi

(10) Patent No.: US 9,887,835 B2
(45) Date of Patent: Feb. 6, 2018

(54) SYMMETRIC STREAM CIPHER

(71) Applicant: TransferSoft, Inc., Culver City, CA (US)

(72) Inventor: Attila Mark Szilagyi, San Pedro, CA (US)

(73) Assignee: TRANSFERSOFT, INC., Culver City, CA (US)

( * ) Notice: Subject to any disclaimer, the term of this patent is extended or adjusted under 35 U.S.C. 154(b) by 208 days.

(21) Appl. No.: 14/819,345

(22) Filed: Aug. 5, 2015

(65) Prior Publication Data
US 2017/0063527 A1    Mar. 2, 2017

(51) Int. Cl.
| H04K 1/00 | (2006.01) |
| H04L 9/00 | (2006.01) |
| H04L 9/28 | (2006.01) |
| H04L 9/06 | (2006.01) |
| H04L 9/14 | (2006.01) |
| G09C 1/00 | (2006.01) |
| H04L 9/18 | (2006.01) |
| H04L 9/20 | (2006.01) |

(52) U.S. Cl.
CPC .............. *H04L 9/065* (2013.01); *G09C 1/00* (2013.01); *H04L 9/0662* (2013.01); *H04L 9/14* (2013.01); *H04L 9/18* (2013.01); *H04L 9/20* (2013.01)

(58) Field of Classification Search
CPC .............. H04L 2209/24; H04L 9/0618; H04L 2209/34; H04L 9/14; H04L 9/008; H04L 63/0435
USPC ......................................................... 380/280
See application file for complete search history.

(56) References Cited

U.S. PATENT DOCUMENTS

| 4,924,515 A | 5/1990 | Matyas et al. | |
| 2002/0176578 A1* | 11/2002 | LaPat | H04L 9/12 380/265 |
| 2004/0019619 A1 | 1/2004 | Buer et al. | |
| 2007/0029453 A1 | 2/2007 | Hsiung | |
| 2012/0063597 A1 | 3/2012 | Tropp et al. | |
| 2014/0016778 A1* | 1/2014 | Goettfert | H04L 9/0869 380/255 |
| 2016/0028544 A1* | 1/2016 | Hyde | H04L 9/0869 380/44 |

FOREIGN PATENT DOCUMENTS

RU    2239290 C2    10/2004

OTHER PUBLICATIONS

International Search Report and Written Opinion dated Oct. 27, 2016, regarding PCT/US2016/043335.

* cited by examiner

*Primary Examiner* — Kambiz Zand
*Assistant Examiner* — Stephen Sanders
(74) *Attorney, Agent, or Firm* — Arent Fox LLP

(57) ABSTRACT

A method, an apparatus, and a computer program product for symmetric stream encryption are provided. An encryption chain is obtained from a real random number generator (RRNG) and stored in memory. A vector key is identified based on numbers obtained from a fast, large period pseudo-random number generator. A set of encryption keys are identified from the encryption chain using the vector key. Strings of clear text are encrypted using the encryption keys.

14 Claims, 4 Drawing Sheets

SYMMETRIC STREAM CIPHER

BACKGROUND

Field

The present disclosure relates generally to data systems, and more particularly, to encryption techniques.

Background

Most modern encryption techniques involve some sensitive information (clear text) combined with an encryption key. An algorithm is provided which enables an authorized user to decrypt the encrypted text (cipher text). Because the cipher text is unintelligible to others, the owner can transport the cipher text safely and freely without worrying that the underlying clear text will be exposed. To decipher the cipher text, both the encryption key and knowledge of the encryption algorithm are required. Such encryption schemes are prevalent in modern computing.

When the same key is used to encrypt and decrypt text, the cipher is referred to as symmetric. Symmetric encryption schemes include, for example, the widely used AES-12, which uses 128 bit encryption keys. The principal difficulty in breaking cipher text using this encryption technique is the fact that there exist $3.4 \times 10^{38}$ different possible keys. Performing a search to identify the correct encryption key would entail identifying each possible 128 bit combination and attempting each such combination to see if it works. For this reason it is not surprising that even the supercomputers of today would take too long to render viable such a trial-and-error workaround for these cipher types.

Where a sufficiently large sample of real random bits is obtained for use in the key creation process, the sample can be used to encrypt clear text with a high degree of reliability. This is the basis of the theoretical one-time pad (OTP) encryption, a type of symmetric cipher. OTP is an encryption technique in which a randomly generated private key is used only once to encrypt text that is then decrypted by the receiver using a matching one-time pad and key. If the key is truly random, at least as long as the text, never reused in whole or in part, and kept secret, then the resulting cipher text should be impossible to decrypt or break.

However, sufficiently large samples of random bits are naturally difficult to obtain with the speed necessary to accommodate today's computational needs unless a specialized high speed external physical random device, such as a quantum-random number generator (QRNG), is available to achieve the desired speed and level of randomness. In addition to being an additional item of dedicated hardware, QRNGs are often implemented as large PCI or PCIe cards, and can be expensive.

These and other limitations are addressed in the present disclosure.

SUMMARY

A symmetric stream cipher takes advantage of very large period pseudo-random number generators (PRNGs) to sample cipher keys from a real random sample. With each cycle of the PRNG, a new set of encryption keys is used to encrypt clear text. Because of the large period of the PRNG and an appropriately configured size of the random sample, the cipher is akin to an OTP with the period of the PRNG.

In an aspect of the disclosure, an apparatus and a computer program product are provided. The apparatus includes a memory, and a processor coupled to the memory and configured to obtain an encryption chain from a real random number generator (RRNG), store the encryption chain in the memory, identify at least one vector key, select a plurality of encryption keys from the encryption chain using the at least one vector key, and encrypt strings of clear text using the plurality of encryption keys.

In another aspect of the disclosure, the apparatus includes a processing system configured to obtain an encryption chain from a real random number generator (RRNG), obtain a vector key from a pseudo random number generator (PRNG), select a plurality of encryption keys from the encryption chain using coordinates from the vector key, and encrypt strings of clear text using the plurality of encryption keys.

In another aspect of the disclosure, a computer program product includes a non-transitory computer-readable medium having computer executable code for obtaining an encryption chain from a real random number generator (RRNG), identifying at least one vector key, selecting a plurality of encryption keys from the encryption chain using the at least one vector key, and encrypting strings of clear text using the plurality of encryption keys.

Additional advantages and novel features will be set forth in part in the description that follows, and in part will become more apparent to those skilled in the art upon examination of the following or upon learning by practice thereof.

DETAILED DESCRIPTION

Figure 1:
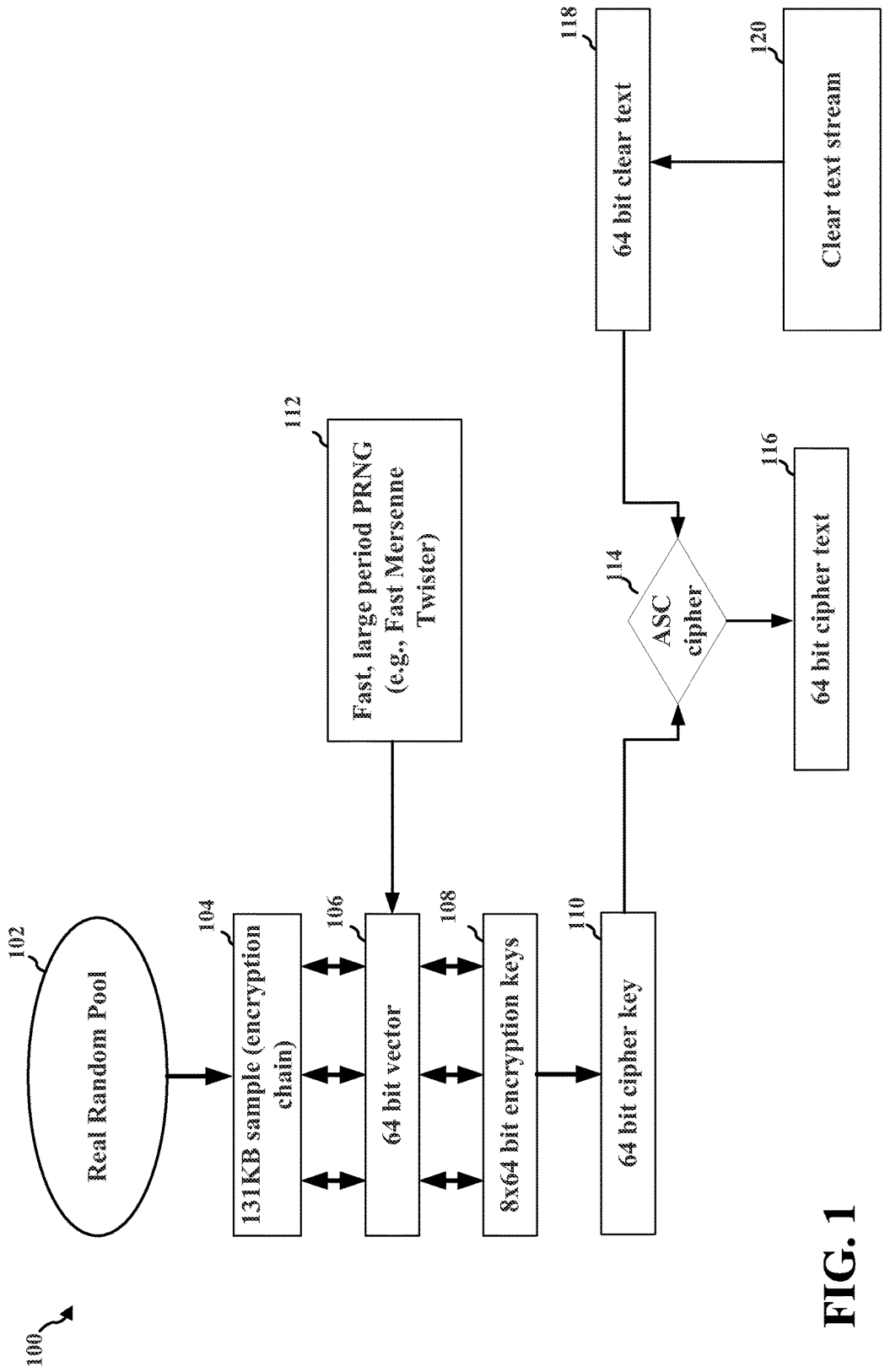
FIG. 1 is a conceptual diagram illustrating an Add-Sub-Chain (ASC) symmetric stream cipher.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of systems for data transfer will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a conceptual diagram 100 illustrating an Add-Sub-Chain (ASC) symmetric stream cipher. In an aspect of the disclosure, an ASC cipher works under the premise of the OTP. A large sample is taken from a real random pool 102. For purposes of this disclosure, the real random pool may be derived from a real random bit generator, the latter of which may be used interchangeably herein with a real random number generator (RRNG). In an embodiment, the ASC cipher uses a 131 Kilobyte sample (104), which may be taken from real random pool 102. This 131 KB sample is referred to herein an encryption chain. In essence, for this embodiment, the encryption chain is 131 KB of real random bits sampled from the RRNG.

Next, a high-speed PRNG 112 having a very large period may be used. In an embodiment, a Fast-Mersenne-Twister (FMT) PRNG is used for this purpose. It will be appreciated by those skilled in the art, however, that there are a number of suitable PRNGs that can be employed depending on the application and design constraints. In one implementation, a suitable PRNG has a period on the order of roughly $2^{10000}$. The ASC cipher converts the output of the PRNG 112 into a 64-bit vector key 106 whose coordinates are used to take samples from the 131 KB encryption chain 104. The samples taken from the encryption chain 104 using vector key 106 are eight 64-bit encryption keys 108. Essentially, the ASC encryption keys 108 are samples taken from the encryption chain 104 as selected by the PRNG 112 via the 64 bit vector key 106. From the encryption keys 108 a 64 bit cipher key 110 is selected. A 64-bit clear text string 118 is obtained from a clear text stream 120. The ASC cipher 114 combines the 64 bit cipher key 110 with a 64 bit clear text string 118 to produce the resulting cipher text 116.

In the above example, the ASC cipher 114 operates in 64 bit cycles. That is, the cipher takes the 64 bit clear text input 118, encrypts it with a 64 bit cipher key 110, and outputs the resulting 64 bit cipher text 116. After each 64 bit cycle, a new cipher key is generated and the ASC cipher 114 encrypts the next 64 bits of clear text with the new cipher key 110 to produce new cipher text 116. When the process is complete for all of the clear text, the resulting cipher text may thereafter be provided to a user having knowledge of the keys and the cipher to reproduce the clear text from the cipher text.

The ASC cipher algorithm in the illustration of FIG. 1 uses a sample of real random bits and a suitable PRNG. The origin of the real random bits may be based on any suitable physical device or alternatively, a software device such as, for example, the file /dev/random. In the unix operating system, /dev/random serves as a blocking PRNG that allows access to environmental noise collected from device drivers and other sources in order to provide randomness.

In an embodiment, the algorithm uses a 131 KB key buffer of real random bits (RRB). The key buffer is a structure used to cache index pages for minimizing disk I/O. In an embodiment, the key buffer may contain 16,218 vector keys and a PRNG having a period $>2^{10000}$. The 64 bit encryption keys may be selected from the key buffer by the PRNG vectors, as described above. In an embodiment, the cipher combines a 64 bit clear text (T) with a 64 bit encryption key/cipher key (K) to obtain a cipher text (C) as follows:

$$T \otimes K = C$$

where $\otimes$ is the XOR operation.

Encryption Chain and Vector Keys

The encryption chain 104 may be arranged as a two dimensional 256×64 array, with each element being 64 bits. Each element is called a vector key (E). The vector keys (E) are selected by the PRNG vector (V) 106, as described above with reference to FIG. 1. An encryption key (K) 108 may be obtained from any of the vector keys via the following equation for the 256 bit encryption:

$$V \otimes E_0 \otimes E_1 \otimes E_2 \otimes E_3 = K$$

For a 384 bit cipher, the following equation may be used:

$$V \otimes E_0 \otimes E_1 \otimes E_2 \otimes E_3 \otimes E_4 \otimes E_5 = K$$

Decryption of the cipher text is performed by initializing the PRNG to the same seed, or same set of initial values, as was used for the encryption. Provided that the original encryption chain 104 is safely and securely transported to the decryption device, the following operation produces the clear text (T) from the cipher text (C) and cipher key (K) inputs:

$$C \otimes K = T$$

While the cipher uses an exclusive OR operation for purposes of this illustration, other types of operations may be used.

PRNG Vectors and Cycling

The PRNG vectors 106 in the above embodiments are 64 bits wide and are used to select up to eight encryption keys 108 from the 256×64 bit encryption chain 104. For the 256 bit encryption, four 64 bit keys are needed. If the PRNG vector is V and if each byte in the vector is represented as V, then the vector V can be written as:

$$V \rightarrow V_0 V_1 V_2 V_3 V_4 V_5 V_6 V_7$$

Each key in the encryption chain 104 can be noted as $E_n(x, y)$ where x represents matrix column and y represents matrix row. The columns and rows may be indexed by each vector byte ($V_i$) as:

$$E_i(V_m, V_n)$$

where n:{0 ... 7} and m:{0 ... 7}

Thus, for instance, a vector key at the $160^{th}$ column and $12^{th}$ row would be $E_i(160, 12)$. Because there are only 64 rows and each coordinate is eight bits wide, the range of n→n & 64 h must be reduced, where the symbol "&" represents the logical AND operation. Multiple keys from the encryption chain 104 may be combined to obtain the encryption keys 108. For the 256 bit encryption, the following formula applies:

$$V \otimes E_0 \otimes E_1 \otimes E_2 \otimes E_3 = K$$

Note that V is mixed in with the four chain keys.

As described above, the encryption chain 104 is arranged into a 256×64 key array. However, in the above illustration it can be seen that only up to four of the keys are combined in the 256 bit encryption. Because the most expensive operation is the generation of the 64 bit vectors (V) from the PRNG, V can simply be recycled in a different combination to select another set of keys. This recycling can greatly increase encryption speed in view of the fact that no new vectors need be generated for another eight cycles. In particular, the recycling is performed eight times for the 256 bit cipher. Because there are eight coordinates in V (i.e., $V_0 V_1 V_2 V_3 V_4 V_5 V_6 V_7$) and each coordinate may serve as a row or column index, 64 different key ($E_i$) selections are allowed from the chain. For the 256 bit encryption, four of the key selections may be combined to produce a cipher key (K) as described above. If no repetitions of the keys are permitted in any four keys combined and no repetitions of the same four key combination are allowed, we have:

$$64!/(64-4)! = 15249024$$

allowed key combinations per vector key. Out of this large space, only the subspace is used where each key may appear only once. For example:

$$V \otimes E_0(V_0, V_0) \otimes E_1(V_0, V_1) \otimes E_2(V_0, V_2) \otimes E_3(V_0, V_3) = K_0$$

$$V \otimes E_4(V_1, V_0) \otimes E_5(V_1, V_1) \otimes E_6(V_1, V_2) \otimes E_7(V_1, V_3) = K_1$$

$$V \otimes E_8(V_2, V_0) \otimes E_9(V_2, V_1) \otimes E_{10}(V_2, V_2) \otimes E_{11}(V_2, V_3) = K_2$$

$$V \otimes E_{12}(V_3, V_0) \otimes E_{13}(V_3, V_1) \otimes E_{14}(V_3, V_2) \otimes E_{15}(V_3, V_3) = K_3$$

$$V \otimes E_{16}(V_4, V_0) \otimes E_{17}(V_4, V_1) \otimes E_{18}(V_4, V_2) \otimes E_{19}(V_4, V_3) = K_4$$

$$V \otimes E_{20}(V_5, V_0) \otimes E_{21}(V_5, V_1) \otimes E_{22}(V_5, V_2) \otimes E_{23}(V_5, V_3) = K_5$$

$$V \otimes E_{24}(V_6, V_0) \otimes E_{25}(V_6, V_1) \otimes E_{26}(V_6, V_2) \otimes E_{27}(V_6, V_3) = K_6$$

$$V \otimes E_{28}(V_7, V_0) \otimes E_{29}(V_7, V_1) \otimes E_{30}(V_7, V_2) \otimes E_{31}(V_7, V_3) = K_7$$

Generally, each cipher key K should be different in terms of the combination of exclusive selections of vector key E, in terms of $$E_0 \otimes E_1 \otimes E_2 \otimes E_3$$

The value of any K may in theory be the same in a cycle, although in practice this eventuality is very unlikely.

Each $K_i$ is used for encryption at the corresponding 64-bit plain text offset. Thus, 8×64 bit or 64 bytes may be encrypted per vector (V) generated. The 128 bit and 512 bit encryptions may each use another set of vector cycling rules. Cycling saves computational time while simultaneously disallowing identical key combinations to be selected that would otherwise result in the same $K_i$. Even though the difference in the $K_i$ is 64 bits/cycle, a new set may be generated after each vector cycle in which four keys are combined. This keeps the encryption safely at 256 bits.

Further, choosing to cycle after eight keys (K) generated is arbitrary, and may be increased to further improve performance. There becomes a point, however, where encrypting a high enough number of bytes per cycle begins to tax the processor, and as a result, the computational time increases. Accordingly, the reliability increase in encryption precision can be balanced with performance to achieve the desired result.

Initialization, Cycles

The encryption technique described in the above embodiments function in vector-key cycles, so that for each N cycle, N×64 bits of clear text may be encrypted and a new vector is generated by the PRNG, which in turn selects a new set of vector keys from the key array, and so on. An additional selection rule may be used to exclude the same key from being used in the same encryption cycle, as described above. The number of different cipher keys for the 256 bit encryption from a single key array is approximately $7.2 \times 10^{16}$ and the mean cycle of the cipher is approximately $9 \times 10^{15}$ bytes or 9000 Terabytes. The exact cycle is considerably larger still, because of the fact that the PRNG vectors are used and also because of the cycle of the PRNG itself Mixing Keys When the vector keys are mixed with the clear text, a self-encrypting key array results. This method makes it increasingly difficult for someone to "steal" the key array, because once encryption begins, the initial key state rapidly disappears. Nothing, not even the cipher itself, can recover the initial key state, and the only way to decrypt the cipher text at this point is to be in possession of the exact copy of the initial key state.

The encryption scheme described herein is well suited, among other applications, for data in flight where fast encryption with disposable keys is desirable. For each transfer session a new random key may be generated. The encryption process begins by securely exchanging the key array and the PRNG seed. Once the PRNG is initialized with the seed, it cycles for each 64 bit input. The nodes remain synchronized by the PRNG. Data is encrypted at one node and decrypted at the other. For the duration of the transfer session, the keys are kept, and then discarded at the end of the session.

Figure 2:
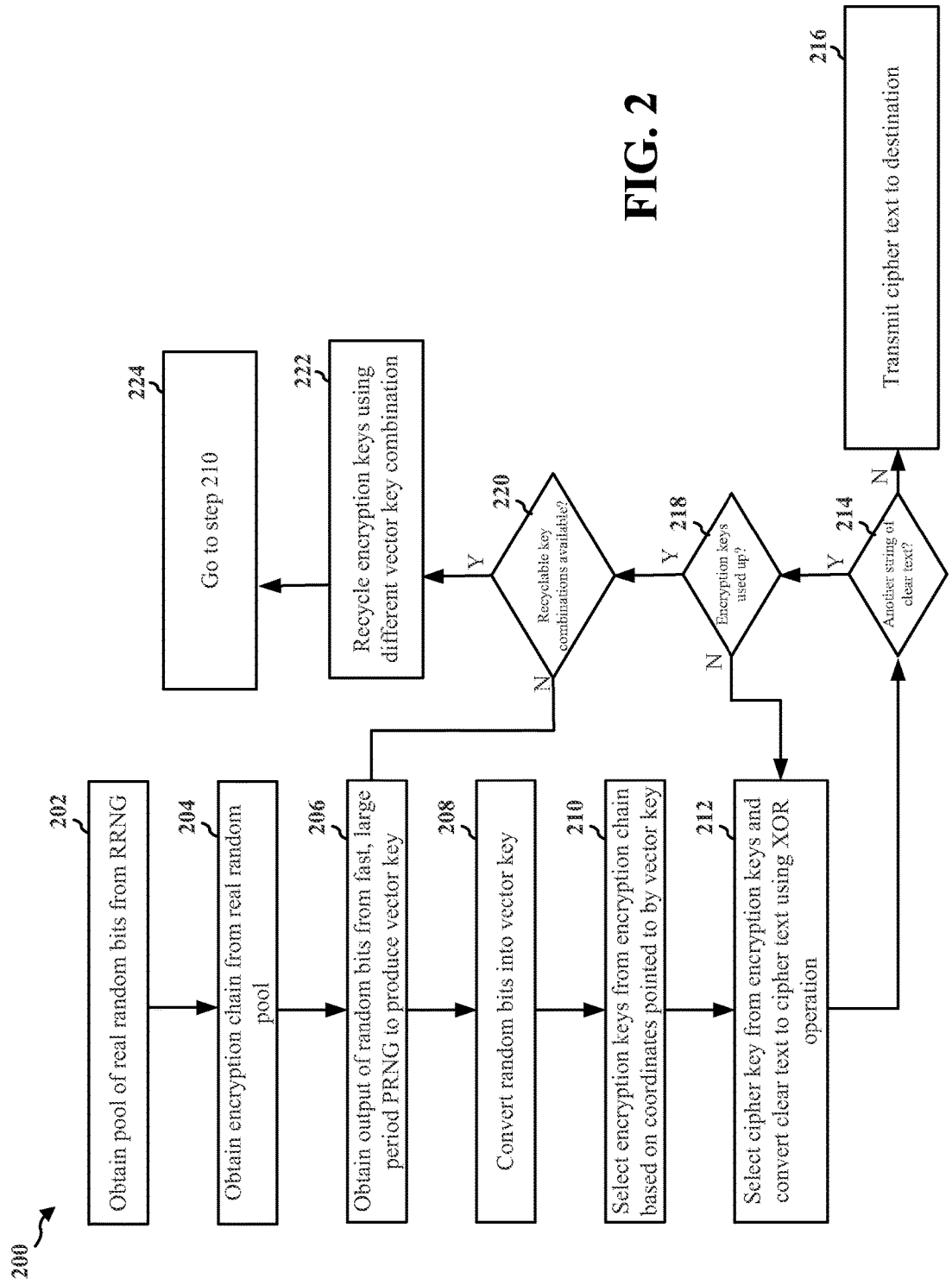
FIG. 2 is a flow diagram illustrating a method of symmetric stream encryption.

FIG. 2 is a flow diagram 200 illustrating a method for encrypting text in accordance with an embodiment. The text may be from a computer file, a website, e-mail, text, or any other form of electronic data where encryption is desirable. The method may be performed by a computer program residing on a source node, such as a computer server, workstation, PC, tablet device, cellular handset, and the like. A pool of real random bits is obtained from an RRNG (202). An encryption chain is obtained from the real random pool (204). The encryption chain may include, for example, the 131 KB sample as described above with reference to FIG. 1.

Thereupon, an output of random bits is obtained from a fast and large period PRNG (206). The random bits are converted into a vector key (208). Then a set of encryption keys are selected from the encryption chain based on the coordinates pointed to in the chain by the vector key (210). From the encryption keys a first cipher key is selected and is used to encrypt the first string of clear text (212). The encryption technique may use, for example, an XOR operation as described above. In an embodiment, the string of clear text is equal sized with respect to the cipher key. For example, each may be 64 bits.

After a string is encrypted, it is determined whether another string of text for encrypting is present (214). This string of text may, for example, be the next bit section from the same file. If all of the clear text has been encrypted, the cipher text is transmitted to a destination node (216). If additional strings of text are present, it is determined whether there are available encryption keys remaining (218). If the encryption keys are not used up, i.e., they are still available, then an available cipher key is selected and encrypted with the next available string of clear text (212). If there are no more encryption keys, it is determined whether there are recyclable key combinations available (220). For example, it may be determined whether there are different combinations of the vector key. If not, then a new sample of random bits is obtained from the PRNG to produce a new vector key (206), and the process of encryption continues with the new vector key. If there are recyclable combinations available, then a new combination of the vector key may be used (222) to select the new encryption keys from the encryption chain based on coordinates pointed to by the modified vector key, as described above (210), and to convert clear text to cipher text (212). The process continues until all of the clear text is encrypted. The cipher text is then transmitted (216).

Figure 3:
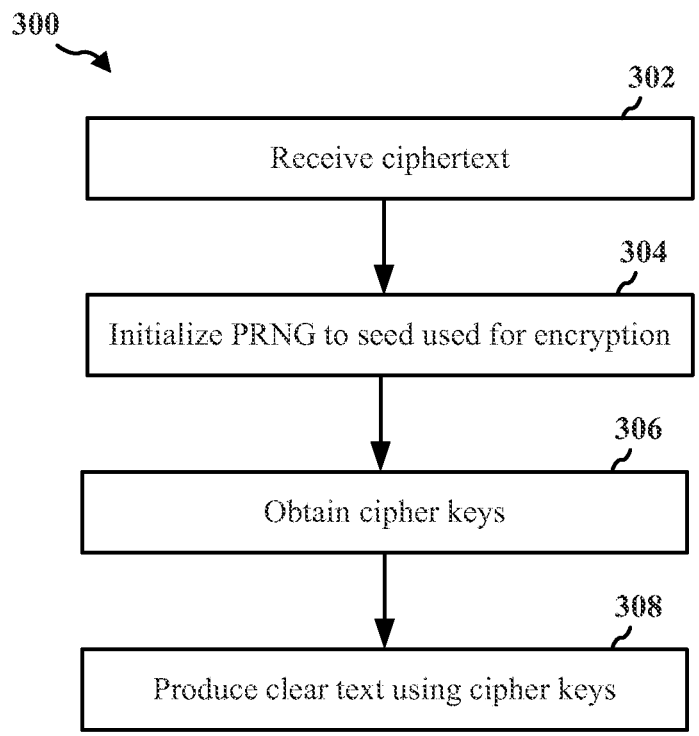
FIG. 3 is a flow diagram illustrating a method of symmetric decryption.

FIG. 3 is a flow diagram 300 illustrating a method of decryption. A destination node receives an encrypted file or block of cipher text (302). The destination node initializes the PRNG to the seed used for encryption (304), and thereby obtains the cipher keys in a manner described above (306). Each string of cipher text is then combined with the encryption key to produce the resulting string of clear text, until an unencrypted version of the file or block is recovered (308).

Figure 4:
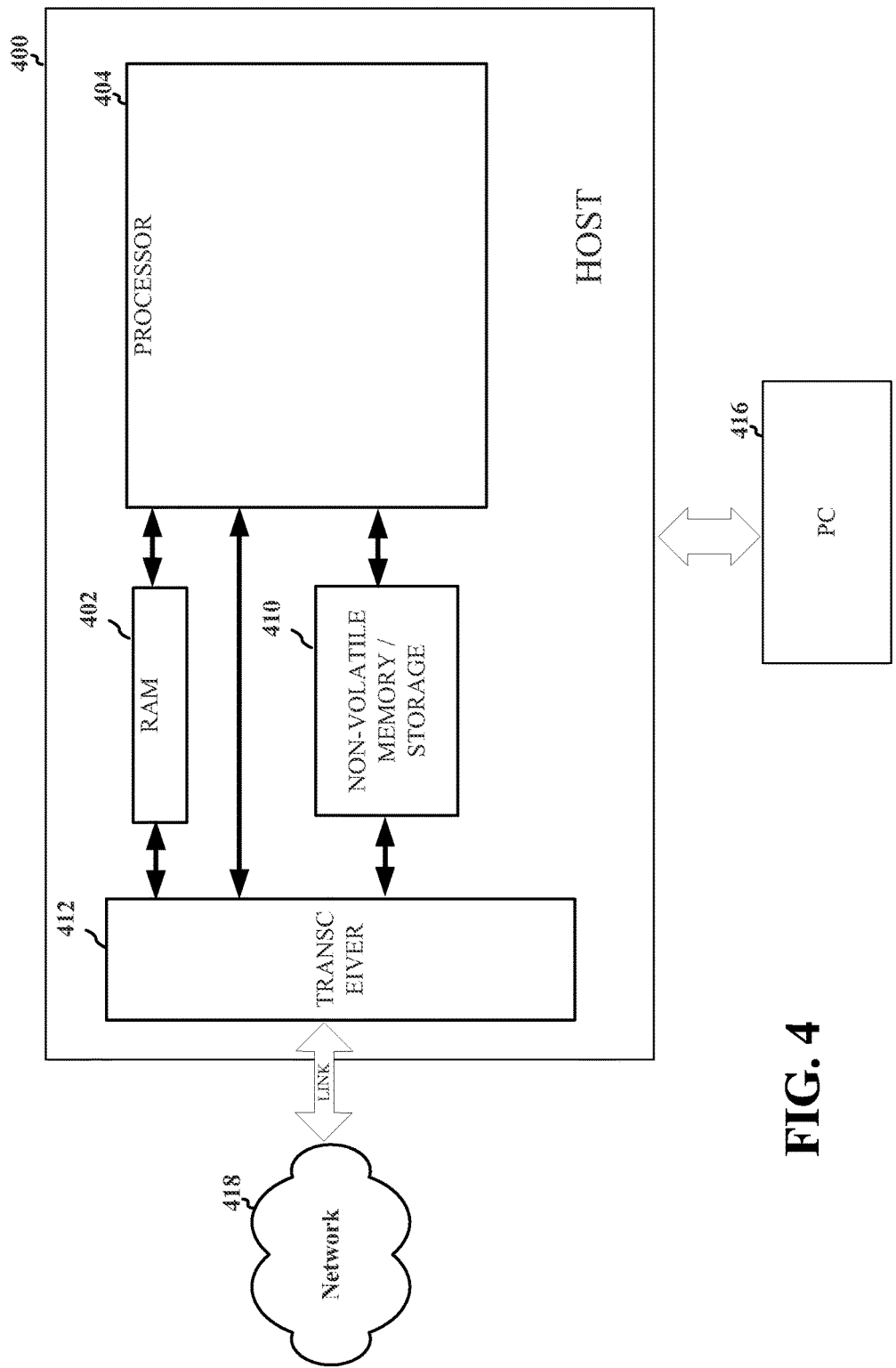
FIG. 4 is a diagram illustrating an apparatus for encrypting and decrypting data.

FIG. 4 is a diagram illustrating an apparatus 400 for encrypting and decrypting data. The apparatus includes a processor 404, which may be implemented as the processing system described above. The apparatus includes random access memory 402. Random access memory may include, in addition to or as part of main memory, a cache memory and buffer memory. The apparatus further includes non-volatile memory/storage 410 (which in some configurations may be part of the processing system), such as a hard drive or storage array. Coupled to the processor 404, RAM 402 and non-volatile memory/storage 410 is transceiver 412, which typically contains the electronics and protocols for transmitting and receiving data, including encrypted data, in the form of data packets over a network 418 and an associated network link. A separate machine 416 such as a PC may allow a user to download files received on apparatus 400 or to upload files to apparatus 400 via any connection means available. The steps described in any of the conceptual diagrams or flow diagrams, and further steps as described in the disclosure herein, may be implemented as one or more software module run on processor 402, one or more firmware modules, or one or more dedicated hardware modules.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus, comprising: a memory; and
a processor coupled to the memory and configured to:
obtain an encryption chain from a real random number generator (RRNG); store the encryption chain in the memory;
identify at least one vector key using bits obtained from a pseudo random number generator (PRNG);
select a plurality of encryption keys from the encryption chain using the at least one vector key; and
encrypt strings of clear text using the plurality of encryption keys;
the apparatus, wherein the processor is further configured to: select a different combination of the at least one vector key in response to each of the plurality of encryption keys being used to encrypt the clear text:
obtain a new plurality of encryption keys from the encryption chain based on the different combination of the at least one vector key; and
encrypt additional strings of clear text using the new plurality of encryption keys.

2. The apparatus of claim 1, wherein the PRNG comprises a Mersenne Twister PRNG.

3. The apparatus of claim 1, wherein the PRNG comprises a period greater than $2^{10000}$.

4. The apparatus of claim 1, wherein the encryption keys are selected from the encryption chain based on coordinates provided by the at least one vector key.

5. The apparatus of claim 1, wherein an encryption key of the plurality of encryption keys is encrypted with an equal sized string from the strings of clear text using an exclusive OR (XOR) operation.

6. An apparatus, comprising: a memory;
a processing system coupled to the memory and configured to:
obtain an encryption chain from a real random number generator (RRNG): store the encryption chain in the memory:
obtain a vector key from a pseudo random number generator (PRNG); select a plurality of encryption keys from the encryption chain using coordinates from the vector key; and
encrypt strings of clear text using the plurality of encryption keys;
the apparatus, wherein the processing system is further configured to:

select a different combination of the vector key once each of the pluraity of encryption keys are used to encrypt the strings of clear text:
obtain a new pluraity of encryption keys from the encryption chain based on the different combination of the vector key: and
encrypt additional strings of clear text using the new plurality of encryption keys.

7. The apparatus of claim 6, wherein the PRNG comprises a Mersenne Twister PRNG.

8. The apparatus of claim 6, wherein the PRNG comprises a period greater than $2^{10000}$.

9. The apparatus of claim 6, wherein an encryption key of the plurality of encryption keys is encrypted with an equal sized string from the strings of dear text using an exclusive OR (XOR) operation.

10. A computer program product comprising a non-transitory computer-readable medium having computer executable code stored in a memory which code, when executed by a processor coupled to the memory. performs a process for:
obtaining an encryption chain from a real random number generator (RRNG); identifying at least one vector key using bits obtained from a pseudo random number generator (PRNG);
selecting a plurality of encryption keys from the encryption chain using the at least one vector key; and
encrypting strings of clear text using the plurality of encryption keys;
the computer program product, further comprising code for: selecting a different combination of the at least one vector key in response to each of the plurality of encryption keys being used to encrypt the clear text:
obtaining a new plurality of encryption keys from the encryption chain based on the different combination of the at least one vector key; and
encrypting additional strings of clear text using the new plurality of encryption keys.

11. The computer program product of claim 10, wherein the PRNG comprises a Mersenne Twister PRNG.

12. The computer program product of claim 10, wherein the PRNG comprises a period greater than $2^{10000}$.

13. The computer program product of claim 10, wherein the encryption keys are selected from the encryption chain based on coordinates provided by the at least one vector key.

14. The computer program product of claim 10, wherein an encryption key of the plurality of encryption keys is encrypted with an equal-sized string of clear text from the strings of clear text using an exclusive OR (XOR) operation.

* * * * *